(No Model.) 2 Sheets—Sheet 1.
W. C. HADDEN.
SHUTTER FOR PHOTOGRAPHIC CAMERAS.
No. 331,494. Patented Dec. 1, 1885.
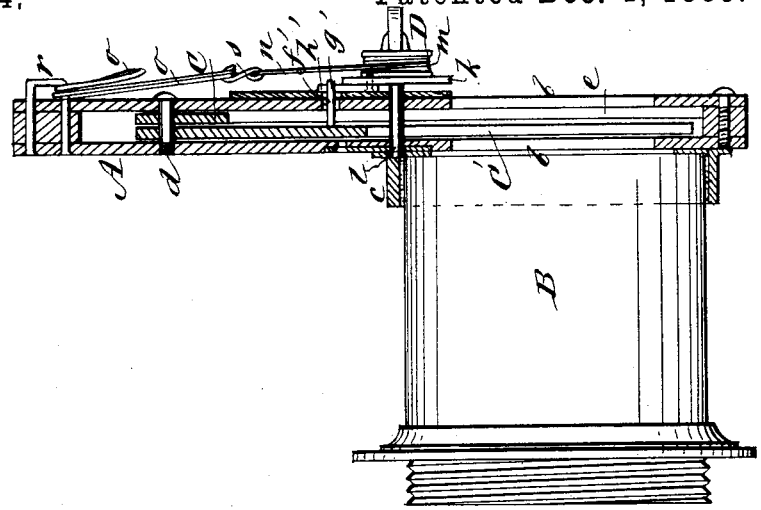
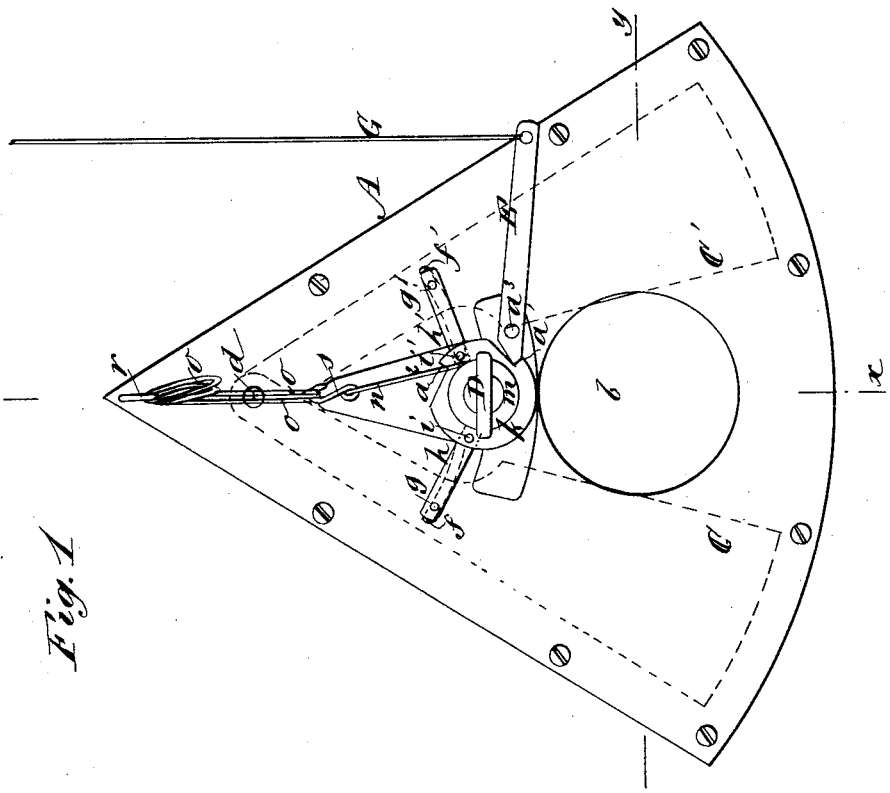
WITNESSES:
C. Neveux
C. Sedgwick
INVENTOR:
W. C. Hadden
BY Munn & Co
ATTORNEYS.

(No Model.) 2 Sheets—Sheet 2.
W. C. HADDEN.
SHUTTER FOR PHOTOGRAPHIC CAMERAS.
No. 331,494. Patented Dec. 1, 1885.
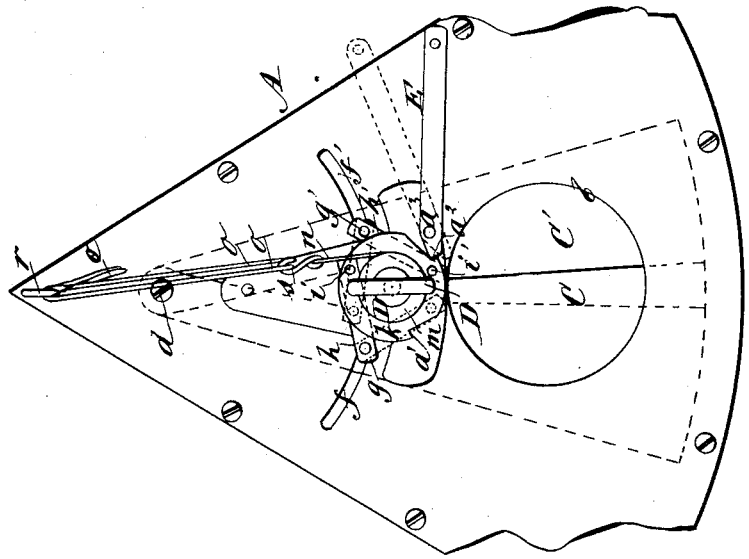
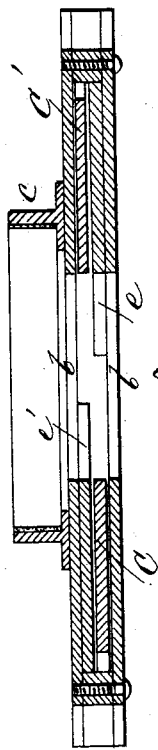
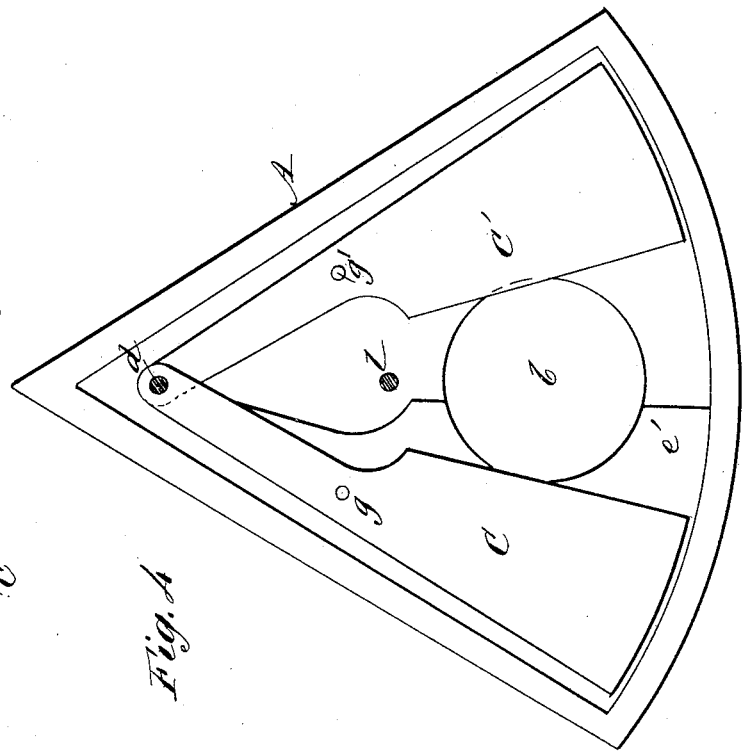
WITNESSES:
C. Neveux
C. Sedgwick
INVENTOR:
W. C. Hadden
BY Munn & Co.
ATTORNEYS.

UNITED STATES PATENT OFFICE.

WILLIAM C. HADDEN, OF NEW YORK, N. Y.

SHUTTER FOR PHOTOGRAPHIC CAMERAS.

SPECIFICATION forming part of Letters Patent No. 331,494, dated December 1, 1885.

Application filed September 14, 1885. Serial No. 177,094. (No model.)

*To all whom it may concern:*

Be it known that I, WILLIAM C. HADDEN, of the city, county, and State of New York, have invented certain new and useful Improvements in Shutters for Photographic Cameras, of which the following is a full, clear, and exact description.

This invention relates to divided or double pivoted shutters which, when used for taking instantaneous pictures, have—that is, each shutter—a reciprocating action during the time of exposure, subject to control by a spring; and the invention further relates to photographic double shutters in which a rotatable button or crank and link mechanism is used in connection with the shutters for operating them.

The invention consists in a novel construction, arrangement, and combination of parts embracing these two elementary features in divided or double shutters, substantially as hereinafter described, and pointed out in the claims, and whereby great compactness and efficiency are attained.

Reference is to be had to the accompanying drawings, forming part of this specification, in which similar letters of reference indicate corresponding parts in all the figures.

Figure 1 represents a front view of the shutter-frame with the shutters in their open position, as for focusing, and the means used to actuate and control said shutters or shutter-sections. Fig. 2 is a section of the same, taken mainly upon the line $x\,x$ in Fig. 1, showing the invention as applied to the lens-tube of a camera. Fig. 3 is a section at right angles to Fig. 2 upon the line $y\,y$ in Fig. 1. Fig. 4 is a front view of the interior of the shutter-frame with the shutters in their open position; and Fig. 5, a front view of the whole as in Fig. 1, but with the shutter closed and held or set ready for an exposure.

While the shutter may be used for time-pictures, it is more particularly intended for taking instantaneous ones, and in its operation moves rapidly quite widely, so as to admit a large quantity of light, and this chiefly through the central portion of the lens.

A indicates the shutter-frame, which is in the form of a hollow case of any suitable shape, and having an exposure-aperture, $b$. It may be provided on its back with a circular flange, $c$, adapted to fit over the forward end of the lens-tube B of the camera, or it may be otherwise carried and secured.

C C' are the shutters or shutter-sections, the two combined forming what may be termed a "divided" or "double" shutter. These shutters are hung to independently turn or vibrate in opening and closing upon a pivot, $d$, arranged centrally above the exposure-aperture $b$. Said shutters, which work within the case A, are arranged to move in different planes, the one immediately behind the other, so that when the shutters are closed their approximate edges or margins will overlap one another, as shown in Fig. 5, for the purpose of effectually excluding the light. When closed, they strike and are arrested by stops $e$ $e'$ within the frame or case A, or they may have the extent of their movement limited by any suitable means. Projecting from the faces of the shutters C C', above the aperture $b$ in the face-plate of the case A, and passing through slots $f\,f'$ therein, are pins $g\,g'$. These pins are connected by links $h\,h'$ and pins $i\,i'$ with a rotatable button, D, outside of or in front of the frame or case A—as, for instance, with a disk, $k$, forming a back to or part of said button, that has its spindle $l$ centrally over the aperture $b$, and has the bearings for its spindle in the case or frame. Fast on the face of the disk $k$, so as to turn with it, is a grooved pulley, $m$, to which is attached a cord, $n$, that in turn is connected with any suitable spring, which is here shown as composed of a series of rubber bands, $o\,o$, for actuating the shutters C C' when released. The rubber bands I find make a very satisfactory spring for the purpose, inasmuch as any number of such bands of small size, connected at their one end with a staple or other fastening, $r$, on the shutter-case, and engaging at their opposite end with a hook, $s$, on the cord $n$, may be readily applied and disconnected, and the speed of the shutters can be regulated at will by varying the number or strength of the bands. The button D has a front thumb piece or projection, or is otherwise suitably constructed to provide for turning it by hand against the tension of the spring to set the shutters as required. The disk $k$ of the button has teeth or notches $a'\,a^2$ on or in its periphery, with which—that is, with either notch at a time—a lever, E, pivoted at $a^3$, engages, to hold the shutters after they have been adjusted by suitably turning the button, and until released by tripping the lever pawl or catch E, as by pulling on a cord, G, or otherwise, said lever being self-engaging, either by its own weight or by a spring applied to it with the notched disk.

In the operation of the shutter, the whole attachment or device being placed or secured on the lens-tube, the button D is first turned against the tension of the spring or springs $o$ by the fingers of the operator to open the shutters C C', when the lever E will engage with the first notch, $a'$, in the disk $k$, to hold the shutters open, as shown in Fig. 1. This provides for focusing or for taking a time picture, as the case may be, the cord G being pulled upon when it is required to close the shutters from this locked position by release of the lever E from the notch $a'$, which will cause the spring $o$ to pull upon the cord $n$ and to reverse or suitably turn the button, and through the button, by its connections $g$ $g'$, to close the shutters, as required. To take an instantaneous picture, however, the button D is turned by the fingers in the same direction as used for opening the shutters, beyond the point of engagement of the lever E with the first notch, $a'$, when the shutters will be open and the aperture $b$ exposed, and until the lever E engages with the second notch, $a^2$, in the disk, as shown in Fig. 5. Such additional movement of the button will cause the shutters to be closed and to be held closed, subject to an increased tension of the spring $o$. This opening and closing movement of the shutters by turning the button D in the same direction is due to the arrangement of the links $h$ $h'$, which when the shutters are open, as in Fig. 1, are at their culminating points of connection with the disk $k$, that virtually forms a double crank, and cranks might be substituted for the disk. By "culminating points" is meant that the links $h$ $h'$ are then in straight lines, or nearly so, with the pins $g$ $g'$ and center of the disk $k$. As the button D, however, is further turned in the same direction, to cause the lever E to engage with the second notch, $a^2$, in the disk, the pins $i$ $i'$ pass beyond their dead-center position, and the links $h$ $h'$ work on opposite sides of the center of the disk or double crank, thereby causing the shutters C C' to close, as in Fig. 5. The shutters being thus closed and held closed by the engagement of the lever E with the second notch, $a^2$, when it is required to take an instantaneous picture, the lever E is tripped from said notch $a^2$ by pulling on the cord G or otherwise, which will cause the shutters C C' to rapidly open and close by the movement of the disk or crank-pins $i$ $i'$ from and to opposite sides of the axis of the disk through the pull of the spring $o$ and cord $n$ on the button and disk, and by the crank movement, as described, for operating the shutters quite a wide exposure for the admission of a large quantity of light will be made during a considerable portion of the movement of the disk, and this chiefly through the central portion of the lens, which is very desirable.

As hereinbefore observed, the shutter may be attached to the camera otherwise than by a flange on the back of the shutter frame or case fitting over the front end of the lens-tube. Thus it may be placed anywhere on the lens-tube or between the lens-tube and box or body of the camera.

It will be observed that the rotatable button or double crank D $k$, having duplicate stops or notches $a$ $a'$ for action in controlling the movement of the shutters, as described, is arranged centrally over the exposure-opening $b$, or, in other words, within the space occupied by the shutters, thus making the whole device much more convenient and compact.

Having thus described my invention, what I claim as new, and desire to secure by Letters Patent, is—

1. The rotatable button or double crank D $k$, having opposite crank-pins $i$ $i$ and stops or notches $a'$ $a^2$, arranged one in advance of the other, in combination with the catch E, a spring controlling the movement of the button in one direction, the pivoted reciprocating shutters C C', and the links $h$ $h'$, substantially as and for the purposes herein set forth.

2. The combination, with the shutter frame or case, of the pendent reciprocating shutters C C', the rotatable button or double crank D $k$, arranged between or within the space occupied by the shutters, and having crank-pins $i$ $i$ and duplicate stops or notches $a'$ $a^2$, the links $h$ $h'$, the pawl or catch E, and a spring applied to turn the button in the one direction, essentially as herein shown and described.

WILLIAM C. HADDEN.

Witnesses:
JAS. M. HENLEY,
C. SEDGWICK.